(12) United States Patent
Feng et al.

(10) Patent No.: US 11,375,497 B2
(45) Date of Patent: Jun. 28, 2022

(54) POWER CONFIGURATION METHOD AND TERMINAL

(71) Applicant: VIVO MOBILE COMMUNICATION CO.,LTD., Guangdong (CN)

(72) Inventors: Sanjun Feng, Chang'an Dongguan (CN); Dajie Jiang, Chang'an Dongguan (CN); Xueming Pan, Chang'an Dongguan (CN); Shuai Zhou, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 121 days.

(21) Appl. No.: 16/976,034

(22) PCT Filed: Feb. 20, 2019

(86) PCT No.: PCT/CN2019/075544
§ 371 (c)(1),
(2) Date: Aug. 26, 2020

(87) PCT Pub. No.: WO2019/161764
PCT Pub. Date: Aug. 29, 2019

(65) Prior Publication Data
US 2020/0413386 A1    Dec. 31, 2020

(30) Foreign Application Priority Data
Feb. 26, 2018   (CN) .......................... 201810160268.X (51) Int. Cl.
*H04W 72/04*    (2009.01)
*H04B 1/3827*    (2015.01)

(52) U.S. Cl.
CPC ........ *H04W 72/044* (2013.01); *H04B 1/3838* (2013.01); *H04W 72/048* (2013.01)

(58) Field of Classification Search
CPC ............. H04W 52/367; H04W 52/146; H04W 72/048; H04W 88/02; H04W 72/044
See application file for complete search history.

(56) References Cited

U.S. PATENT DOCUMENTS

| | | |
|---|---|---|
| 8,792,930 B1 | 7/2014 | Gopalakrishnan et al. |
| 2012/0236800 A1 | 9/2012 | Park et al. |

(Continued)

FOREIGN PATENT DOCUMENTS

| | | |
|---|---|---|
| CN | 102869080 A | 1/2013 |
| CN | 107431987 A | 12/2017 |
| CN | 108702709 A | 10/2018 |
| EP | 2 334 124 A1 | 6/2011 |

(Continued)

OTHER PUBLICATIONS

EP Search Report in Application No. 19756852.0 dated Mar. 19, 2021.

(Continued)

*Primary Examiner* — Keith Ferguson
(74) *Attorney, Agent, or Firm* — Maschoff Brennan (57) ABSTRACT

The embodiments of the present disclosure provide a power configuration method and a terminal. The method includes: determining a percentage of uplink resource; transmitting with high power when the percentage of uplink resource is less than a first percentage, wherein the high power is higher than a maximum transmitting power of a default power class; transmitting with low power when the percentage of uplink resource is greater than or equal to the first percentage, wherein the low power is not higher than the maximum transmitting power of the default power class.

20 Claims, 4 Drawing Sheets

(56) References Cited

U.S. PATENT DOCUMENTS

| | | | |
|---|---|---|---|
| 2014/0187281 A1* | 7/2014 | Faraone | H04W 52/146 455/522 |
| 2016/0286559 A1 | 9/2016 | Abedini et al. | |
| 2017/0265148 A1 | 9/2017 | Balasubramanian et al. | |

FOREIGN PATENT DOCUMENTS

| | | |
|---|---|---|
| WO | 2009/075548 A1 | 6/2009 |
| WO | 2009/076286 A1 | 6/2009 |

OTHER PUBLICATIONS

Written Opinion of the International Searching Authority dated Feb. 26, 2018 as received in Application No. PCT/CN2019/075544.

CN Office Action dated Apr. 15, 2020 as received in Application No. 201810160268.X.

Vivo "Discussion on NR TDD UL/DL configurations and PHUE behavior" 3G99 TSG-RAN WG4 AdHoc 1801; R4-1800414; Jan. 22, 2018.

Vivo "WF on NR TDD UL/DL configurations and HPUE behavior" 3G99 TSG-RAN WG4 AH-1801; R4-1801125; Jan. 22, 2018.

Oppo "Discussion on HPUE NR TDD UL DL configurations" 3GPP TSG-RAN WG4 #86; R4-1801584; Feb. 26, 2018.

Qualcomm Incorporated "Uplink duty cycle restrictions to enable NR HPUE" 3GPP TSG-RAN WG4 #86; R4-1802242; Feb. 26, 2018.

Vivo "Further discussion on NR TDD UL/DL configurations and PHUE behavior" 3GPP TSG-RAN WG4 Meeting #86; R4-1802713; Feb. 26, 2018.

* cited by examiner

POWER CONFIGURATION METHOD AND TERMINAL

CROSS-REFERENCE TO RELATED APPLICATION

This application is the U.S. national phase of PCT Application No. PCT/CN2019/075544 filed on Feb. 20, 2019, which claims priority to Chinese Patent Application No. 201810160268.X filed on Feb. 26, 2018, the disclosures of which are incorporated in their entirety by reference herein.

TECHNICAL FIELD

The present disclosure relates to the field of communications technology, and in particular to a power configuration method and a terminal.

BACKGROUND

In the 5th Generation (5th Generation, 5G) communication systems, there are multiple power classes similar to that of the Long Term Evolution (Long Term Evolution, LTE) system, for example: power class 2. The maximum transmitting power of this power class is 26 dBm, and the power of this power class can be called high power. The maximum transmitting power of power class 3 is 23 dBm, and this power class can be called low power class or default power class. When the maximum transmitting power is higher than 23 dBm, the specific absorption ratio (Specific Absorption Ratio, SAR) of a terminal may exceed the SAR limit.

SUMMARY

The embodiment of the present disclosure provides a power configuration method and a terminal to solve the problem that the SAR of a terminal may be out of limit.

In a first aspect, an embodiment of the present disclosure provides a power configuration method applied to a terminal, including:

determining a percentage of uplink resource;

transmitting with high power when the percentage of uplink resource is less than a first percentage, wherein the high power is higher than a maximum transmitting power of a default power class;

transmitting with low power when the percentage of uplink resource is greater than or equal to the first percentage, wherein the low power is not higher than the maximum transmitting power of the default power class.

In a second aspect, an embodiment of the present disclosure provides a terminal including:

a determination module configured to determine a percentage of uplink resource;

a first transmission module configured to transmit with high power when the percentage of uplink resource is less than a first percentage, wherein the high power is higher than a maximum transmitting power of a default power class;

a second transmission module configured to transmit with low power when the percentage of uplink resource is greater than or equal to the first percentage, wherein the low power is not higher than the maximum transmitting power of the default power class.

In a third aspect, an embodiment of the present disclosure provides a terminal including: a storage, a processor, and a computer program stored on the storage and capable of running on the processor, the computer program implementing, when executed by the processor, the steps of the power configuration method provided by the embodiment of the present disclosure.

In a fourth aspect, an embodiment of the present disclosure provides a computer readable storage medium having a computer program stored thereon, the computer program implementing, when executed by a processor, the steps of the power configuration method provided by the embodiment of the present disclosure.

In the embodiments of the present disclosure, the radiation SAR of a terminal can be prevented from being out of limit by: determining a percentage of uplink resource; transmitting with high power when the percentage of uplink resource is less than a first percentage, wherein the high power is higher than a maximum transmitting power of a default power class; and transmitting with low power when the percentage of uplink resource is greater than or equal to the first percentage, wherein the low power is not higher than the maximum transmitting power of the default power class.

BRIEF DESCRIPTION OF THE DRAWINGS

In order to explain the technical solutions of the embodiments of the present disclosure more clearly, the accompanying drawings used in the description of the embodiments of the present disclosure will be described briefly below. Obviously, the drawings in the following description are only some embodiments of the present disclosure. For those of ordinary skill in the art, other drawings may be obtained based on these drawings without creative labor.

DETAILED DESCRIPTION

Hereinafter, the technical solutions in the embodiments of the present disclosure will be described clearly and thoroughly in conjunction with the drawings in the embodiments of the present disclosure. Obviously, the described embodiments are part of the embodiments of the present disclosure, but not all of the embodiments. Based on the embodiments in the present disclosure, all other embodiments obtained by a person of ordinary skill in the art without creative efforts should fall within the protection scope of the present disclosure.

Figure 1:
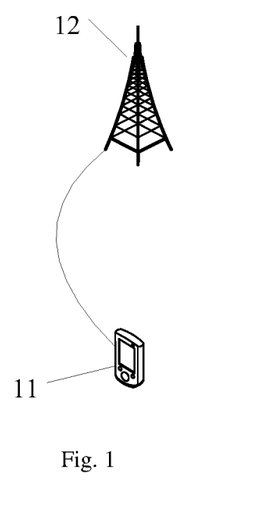
FIG. 1 is a structural diagram of a network system to which an embodiment of the present disclosure may be applied.

Referring to FIG. 1, it is a structural diagram of a network system to which an embodiment of the present disclosure may be applied, which includes, as shown in FIG. 1, a terminal 11 and a base station 12, wherein the terminal 11 may be a user equipment (UE), or another terminal equipment such as a mobile phone, a tablet personal computer, a laptop computer, a personal digital assistant (PDA), a mobile Internet device (MID), or other terminal-side devices such as a wearable device, etc. It should be noted that the specific type of the terminal 11 is not limited in the embodiments of the present disclosure. The terminal 11 may communicate with the base station 12. For example, SDU transmission may be performed between the terminal 11 and the base station 12. The above base station 12 may be a base station of 5G and later versions (for example: gNB, 5G NR NB), or a base station in other communication systems, or called Node B, Evolved Node B, or other vocabulary in the field, as long as it reaches the same technical effect, the base station is not limited to specific technical vocabulary. It should be noted that, in the embodiments of the present disclosure, only a 5G base station is taken as an example, but the specific type of the base station 12 is not limited.

Figure 2:
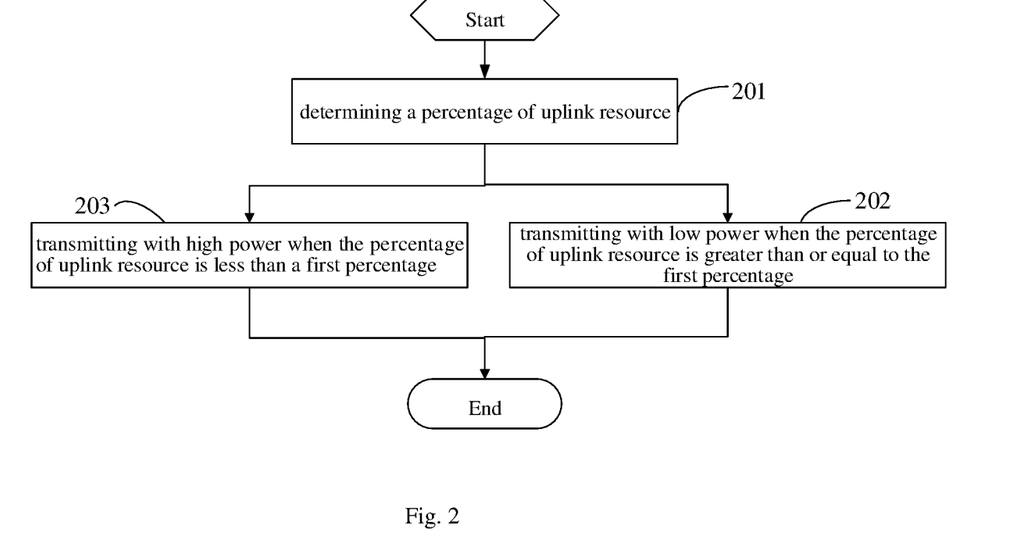
FIG. 2 is a flowchart of a power configuration method according to an embodiment of the present disclosure.

Referring to FIG. 2, it is a flowchart of a power configuration method according to an embodiment of the present disclosure, the method is applied to a terminal, and as shown in FIG. 2, includes the following steps:

Step 201, determining a percentage of uplink resource.

Wherein, the above determining the percentage of uplink resource may be: determining whether the percentage of uplink resource is less than a first percentage, e.g., 50%. Of course, in the embodiment of the present disclosure, it is not limited to 50%, for example, may be 45% or 55%. In addition, in Step 201, it can be directly determined for a specific slot format (such as a slot format predefined by a protocol, or a slot pre-configured by the network, etc.) that the percentage of uplink resource is less than the first percentage. Of course, Step 201 can also determine the resource of a certain time period or of some slot formats to determine the percentage of uplink resource thereof.

It should be noted that, in the embodiment of the present disclosure, the above first percentage may be preset by the terminal, or predefined by the protocol, or pre-configured by the network, or the like.

Step 202, transmitting with high power when the percentage of uplink resource is less than a first percentage, wherein the high power is higher than a maximum transmitting power of a default power class.

If the percentage of uplink resource determined in Step 201 is less than the first percentage, high power may be used for transmission. This is because that, if the percentage of uplink resource is less than the above first percentage, it means that the transmission number of the terminal is relative small, and thus, the radiation SAR of the terminal is not high when high power is used for transmission, thereby preventing the radiation SAR of the terminal from being out of limit.

It should be noted that, the above default power class may be pre-configured by the terminal, or predefined in the protocol, or pre-configured by the network, for example, the power class 3, the maximum transmitting power of which may be 23 dBm.

Of course, the above high power may be less than or equal to the maximum transmitting power of another power class, e.g., the power class 2, the maximum transmitting power of which may be 26 dBm. Similarly, this power class may also be pre-configured by the terminal, or predefined in the protocol, or pre-configured by the network.

Step 203, transmitting with low power when the percentage of uplink resource is greater than or equal to the first percentage, wherein the low power is not higher than the maximum transmitting power of the default power class.

If the percentage of uplink resource determined in Step 201 is greater than or equal to the first percentage, low power may be used for transmission. This is because that, when the percentage of uplink resource is greater than or equal to the first percentage, the radiation SAR of the terminal may be out of limit if high power is used for transmission, thereby low power is used for transmission to prevent the radiation SAR of the terminal from being out of limit.

Through the above steps, it can be achieved that, when the percentage of uplink resource is less than the first percentage, high power is used for transmission; otherwise, low power is used for transmission to prevent the radiation SAR of the terminal from being out of limit.

It should be noted that the above method may be applied to a 5G system, but this is not limited, and it is applicable to other communication systems as long as substantially the same function can be achieved. For example, it can be applied to a 6G system, or another communication system using high power for transmission, or the like.

In the embodiment of the present disclosure, the radiation SAR of a terminal can be prevented from being out of limit by: determining the percentage of uplink resource; transmitting with high power when the percentage of uplink resource is less than the first percentage, wherein the high power is higher than a maximum transmitting power of a default power class; and transmitting with low power when the percentage of uplink resource is greater than or equal to the first percentage, wherein the low power is not higher than the maximum transmitting power of the default power class.

Figure 3:
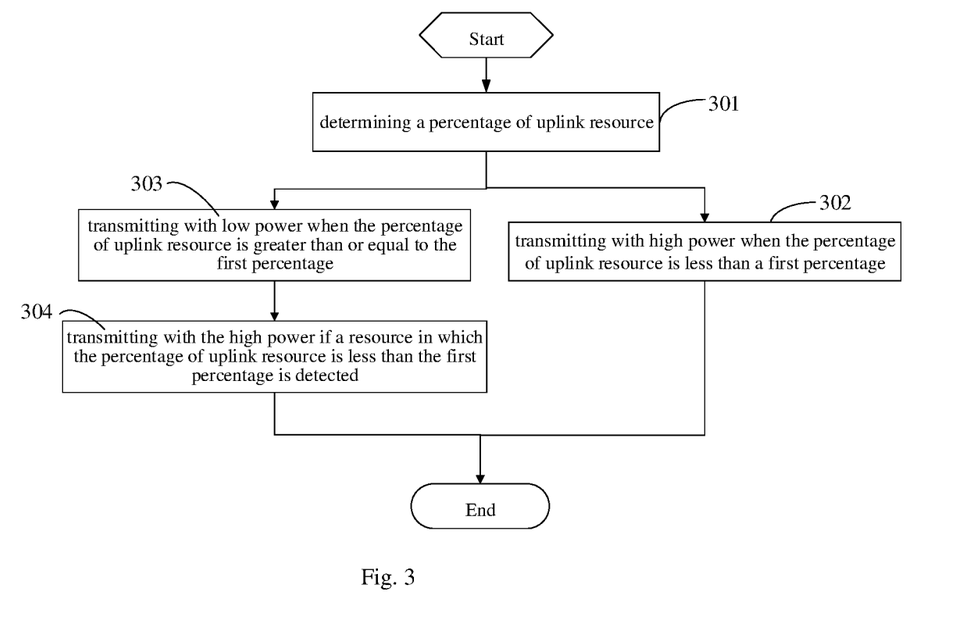
FIG. 3 is a flowchart of another power configuration method according to an embodiment of the present disclosure.

Referring to FIG. 3, it is a flowchart of another power configuration method according to an embodiment of the present disclosure. The method is applied to a terminal, and as shown in FIG. 3, includes the following steps:

Step 301, determining a percentage of uplink resource.

Step 302, transmitting with high power when the percentage of uplink resource is less than a first percentage, wherein the high power is higher than a maximum transmitting power of a default power class.

Wherein, the above transmitting with high power may be: transmitting with high power in a case that the percentage of uplink resource is less than the first percentage; or transmitting with high power in a resource in which the percentage of uplink resource is less than the first percentage, for example, transmitting with high power in the above slot with a first slot format or a second slot format.

In an optional implementation, the transmitting with high power when the percentage of uplink resource is less than a first percentage includes:

transmitting with high power if the terminal works in a slot with a preset slot format, wherein a percentage of uplink symbols with the preset slot format is less than the first percentage.

Wherein, the above preset slot format may be a preconfigured slot format, e.g., a slot format pre-configured by the terminal, or predefined by the protocol, or pre-configured by the network. The percentage of uplink symbols is less than the first portion.

In this way, it can be achieved that, for the above preset slot format, the terminal can directly determine that its percentage of uplink resource is less than the first percentage, and no further judgment is required, thereby improving the working efficiency of the terminal. In addition, the above preset slot format may be a subset of all slot formats prescribed by the protocol. Moreover, if the terminal always works in the above preset slot format, the terminal may always use the above high power for transmission. Alternatively, the network can configure the terminal to work in the slot with the above preset slot format, so that the terminal can transmit with high power.

Optionally, the determining the percentage of uplink resource includes:

determining that the percentage of uplink resource is less than the first percentage if the terminal works in a slot with the preset slot format; or determining a percentage of uplink resource within a certain time period if a working slot of the terminal is not limited to the preset slot format.

Wherein, if the percentage of uplink resource within the certain time period is less than the first percentage, the high power can be used for transmission; if the percentage of uplink resource within the certain time period is greater than or equal to the first percentage, the low power can be used for transmission.

In this implementation, if the terminal works in the slot with the preset slot format, it can directly determine that the percentage of uplink resource is less than the first percentage, and no further judgment is required, thereby improving the working efficiency of the terminal.

Wherein, the above-mentioned "the working slot is not limited to the preset slot format" may be that the working slot of the terminal is not limited to the preset slot format, for example, the working slot of the terminal includes slots with the preset slot format and other slot formats, or the working slot of the terminal does not include the slot with the preset slot format.

Wherein, the certain time period may be a time period configured by the network, or a time period predefined by the protocol, or a time period determined by the terminal, etc., and may be, for example, 2 ms, 2.5 ms, 5 ms, 20 ms, 40 ms, or 1 minute, or a multiple of the frame (10 ms), etc. In addition, the time period may also be a configuration period of the slot format set by the network, such as 5 ms, 20 ms, or a multiple of the frame (10 ms), etc.

In this implementation, the terminal can dynamically determine whether the percentage of uplink resource within a certain time period is less than the first percentage. If the percentage of uplink resource in this time period is less than the first percentage, high power is used for transmission. Otherwise, low power is used for transmission, thereby preventing the radiation SAR of the terminal from being out of limit while improving the flexibility of the terminal to control the transmitting power, so as to improve the working performance of the terminal. Specifically, if the percentage of uplink resource in this time period is less than the first percentage, then high power is used for transmission in this time period, or high power is used for transmission in the next or more time periods of this time period, or, high power is used for transmission in this time period and the next or more time periods of this time period. Using low power to transmit may also be that: low power is used for transmission in this time period, or low power is used for transmission in the next or more time periods of this time period, or, low power is used for transmission in this time period and the next or more time periods of this time period.

Optionally, in this implementation, the uplink symbol may be defined in the following way:

for a slot in which the number of flexible symbols is less than or equal to a symbol number threshold, the flexible symbols in this slot are not used as the uplink symbol;

for a slot in which the number of flexible symbols is greater than the symbol number threshold, the flexible symbols in this slot are used as the uplink symbol according to a third percentage.

Wherein, the not using the flexible symbol as the uplink symbol may be: using the flexible symbol as a guard period (GP) symbol.

It should be noted that, the above is a description for a case that the flexible symbols may be used as the uplink symbol. In the actual counting process, it is also necessary to add uplink symbols configured for uplink transmission. Wherein, the above flexible symbols are flexible symbols introduced by the 5G communication system that may be used as uplink symbols, downlink symbols, or GPs that are not transmitted. The symbol number threshold may be pre-configured by the terminal, or predefined in the protocol, or pre-configured by the network, for example: 3 or 4 symbols. Of course, this number of symbols can also be determined specifically according to the total number of symbols included in the slot. The third percentage may be pre-configured by the terminal, or pre-defined in the protocol, or pre-configured by the network, for example: 50% or 45% or 55%, etc. For example, when there are $<=Y$ (e.g., $Y=4$ or 3) flexible symbols in a slot, these flexible symbols are assumed to be used as GPs and are not considered as uplink symbols; when there are $>Y$ (e.g., $Y=4$) in a slot, these flexible symbols are considered as uplink symbols according to a certain percentage Z (e.g., $Z=50\%$); for example, a slot includes 6 flexible symbols, and the above symbol number threshold is 3 or 4, then the 6 flexible symbols are regarded as uplink symbols at 50%, that is, 6 flexible symbols are counted as 3 uplink symbols. It should be noted that, when the third percentage of flexible symbols in a certain slot is not an integer, the number of uplink symbols can be determined by rounding up and rounding down.

In this implementation, since the flexible symbols are counted flexibly, the situation that the radiation SAR of the terminal is out of limit caused by the flexible symbols introduced by the 5G communication system is avoided.

Optionally, in the above implementation, the above determining the percentage of uplink resource within the certain time period includes:

determining a percentage of uplink slots within the certain time period; or determining a percentage of uplink symbols within the certain time period.

In this way, it is possible to determine the percentage of uplink resource in a certain time period by counting uplink slots and uplink symbols. Specifically, it may be achieved by counting the uplink slots in a certain time period to determine the uplink slots in the certain time period. Alternatively, it may be achieved by counting the uplink symbols in a certain time period to determine the percentage of uplink slots in the certain time period. When the percentage of uplink slots or the percentage of uplink symbols is less than the first percentage, high power is used for transmission. Of course, in the embodiments of the present disclosure, the determining the percentage of uplink resource within a certain time period may also be referred to as: identifying, counting, or judging the percentage of uplink resource in a certain time period.

Wherein, during determining the percentage of uplink resource, the definition of the uplink symbol may be referred to the above description, which will not be repeated here, and the same beneficial effects can be achieved.

The above uplink slot may be defined in the following way:

the uplink slots include: slots in which the percentage of uplink symbols exceeds a second percentage;

wherein, for a slot in which the number of flexible symbols is less than or equal to the symbol number threshold, the flexible symbols in this slot are not used as the uplink symbols;

for a slot in which the number of flexible symbols is greater than the symbol number threshold, the flexible symbols in this slot are used as the uplink symbols according to the third percentage.

In this way, the uplink slot may be defined as a slot in which the percentage of uplink symbols exceeds the second percentage, wherein the second percentage may be pre-configured by the terminal, or predefined in the protocol, or pre-configured by the network, for example: 70% or 65% or 75%, etc.; for example, a slot in which the percentage of uplink symbols exceeds a threshold X (e.g., X=70%) is regarded as the uplink slot.

Wherein, during defining the uplink slot, the uplink symbol needs to be defined in the above manner. Wherein, the flexible symbols are used as uplink symbols according to the third percentage, which may be referred to the above description and will not be repeated here, and the same beneficial effects can be achieved.

For example, the terminal or the network selects a subset of slot format with the percentage of uplink slots not more than 50%, e.g., the above preset slot format. It is prescribed that the uplink slot is defined as the follows: a slot with the percentage of uplink symbols exceeding a threshold X (e.g., X=70%) is regarded as a uplink slot; wherein, the counting method of flexible symbols is: when there are <=Y (e.g., Y=4 or 3) flexible symbols in a slot, these flexible symbols are assumed to be used as GPs and are not counted as uplink symbols; when there are >Y (e.g., Y=4 or 3) flexible symbols in a slot, these flexible symbols are counted as uplink symbols at a percentage Z (e.g., Z=50%). For a high-power terminal, if they are configured in this subset, high power may be used for transmission; or, when it is prescribed that they are not in this subset, high power may not be used for transmission.

For another example, the terminal or the network selects a subset of slot format with the percentage of uplink symbols not more than 50%, e.g., the above preset slot format. Wherein the counting method of flexible symbols is: when there are <=Y (e.g., Y=4 or 3) flexible symbols in a slot, these flexible symbols are assumed to be used as GPs and are not counted as UL symbols; when there are >Y (e.g., Y=4 or 3) flexible symbols, these flexible symbols are counted as uplink symbols at a certain percentage Z (e.g., Z=50%). In this way, according to the above criterion, a subset of slot format with the percentage of uplink symbols not more than 50% is selected. For a high-power terminal, if they are configured in this subset, high power may be used for transmission; or, when it is prescribed that they are not in this subset, high power may not be used for transmission.

Step 303, transmitting with low power when the percentage of uplink resource is greater than or equal to the first percentage, wherein the low power is not higher than the maximum transmitting power of the default power class.

Wherein, the above transmitting with low power may be: transmitting with low power in a case that the percentage of uplink resource is greater than or equal to the first percentage; or transmitting with low power in a resource in which the percentage of uplink resource is greater than or equal to the first percentage, for example, transmitting with low power in a slot with a slot format other than the above first and second slot formats.

In another optional implementation, the above determining the percentage of uplink resource includes:

determining the percentage of uplink resource within a certain time period.

Wherein, if the percentage of uplink resource within the certain time period is less than the first percentage, the high power may be used for transmission; if the percentage of uplink resource within the certain time period is greater than or equal to the first percentage, the low power may be used for transmission.

Wherein, the certain time period may be a time period configured by the network, or a time period predefined by the protocol, or a time period determined by the terminal, etc., for example, 5 ms, 20 ms, or 1 minute, or a multiple of the frame (10 ms), etc. In addition, the time period may also be a configuration period of the slot format set by the network, such as 5 ms, 20 ms, or a multiple of the frame (10 ms), etc.

In this implementation, the terminal can dynamically determine whether the percentage of uplink resource within a certain time period is less than the first percentage. If the percentage of uplink resource in this time period is less than the first percentage, high power is used for transmission in the certain time period. Otherwise, low power is used for transmission, thereby preventing the radiation SAR of the terminal from being out of limit while improving the flexibility of the terminal to control the transmitting power, so as to improve the working performance of the terminal. Specifically, if the percentage of uplink resource in this time period is less than the first percentage, then high power is used for transmission in this time period, or high power is used for transmission in the next or more time periods of this time period, or, high power is used for transmission in this time period and the next or more time periods of this time period. The case of using low power to transmit may also be that: low power is used for transmission in this time period, or low power is used for transmission in the next or more time periods of this time period, or, low power is used for transmission in this time period and the next or more time periods of this time period.

Wherein, for the above determining the percentage of uplink resource within a certain time period, reference may be made to the description of the above implementation. For example, the above determining the percentage of uplink resource within a certain time period includes:

determining a percentage of uplink slots within the certain time period; or determining a percentage of uplink symbols within the certain time period.

Wherein, during determining the percentage of uplink resource, the definitions of the uplink slot and the uplink symbol may be referred to the above description, which will not be repeated here, and the same beneficial effects can be achieved.

In this implementation, it can be achieved that, if the percentage of uplink slots or the percentage of uplink symbols within a certain time period is less than the above first percentage, high power is used for transmission; otherwise, low power is used for transmission.

It should be noted that, the above using the low power for transmission when the percentage of uplink resource is greater than or equal to the first percentage may also be referred to as: the terminal adopting a fallback measure when the percentage of uplink resource is greater than or equal to the first percentage. Wherein the fallback measure may be as follows:

if the network configuration does not meet the above preset slot format, or the percentage of uplink resource is not less than the above first percentage, the terminal can perform evaluation, and if the percentage of uplink resource in a certain period (or a certain time period) is higher than or equal to a certain percentage, it falls back to low-power transmission. Of course, if the terminal detects the above preset slot format within a certain period, or the percentage of uplink resource is less than the above first percentage, it can use high power class for transmission in subsequent periods. For example, in the following implementation:

As shown in FIG. 3, after the transmitting with the low power when the percentage of uplink resource is greater than or equal to the first percentage, the method may further include:

Step 304, transmitting with the high power if a resource in which the percentage of uplink resource is less than the first percentage is detected.

In this implementation, it can be achieved that, after the terminal transmits with low power, if a resource in which the percentage of uplink resource is less than the first percentage is detected, high power is used for transmission, thereby achieving the flexibility of the transmitting power of the terminal, so as to improve the working performance of the terminal Of course, after transmitting with high power when the percentage of uplink resource is less than the first percentage, the method may further include:

transmitting with low power if a resource in which the percentage of uplink resource is greater than or equal to the first percentage is detected. For example, if the configuration for the terminal configured by the network is not limited to a subset of slot format in which the percentage of uplink slots or uplink symbols does not exceed 50%, the terminal can perform evaluation by itself. If the percentage of uplink symbols transmitted or uplink slots transmitted is low in a certain time period (for example, not exceeding 50% actually), it is also possible to use high power for transmission after a certain period; if the percentage of uplink symbols transmitted or uplink slots transmitted is high in a certain time period (for example, higher than 50%), the terminal reduces the transmitting power by itself.

In this embodiment, a variety of optional implementations are added on the basis of the embodiment shown in FIG. 2, all of them can prevent the radiation SAR of the terminal from being out of limit and can also improve the working performance of the terminal.

Figure 4:
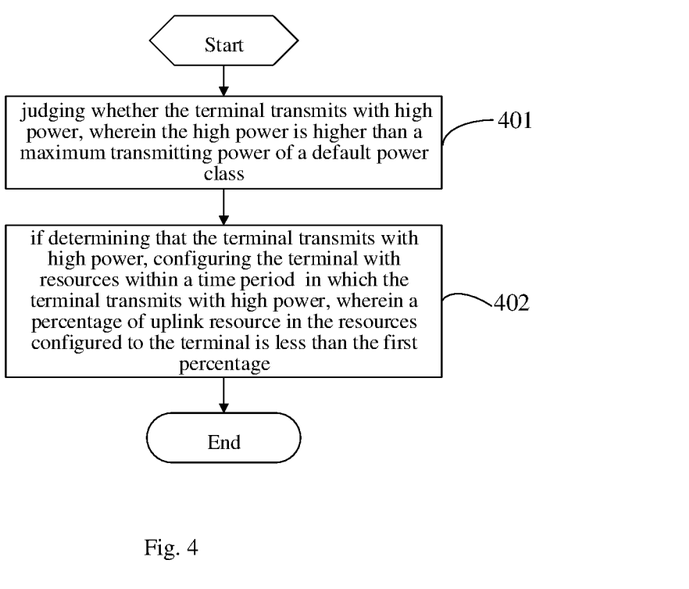
FIG. 4 is a flowchart of another power configuration method according to an embodiment of the present disclosure.

Referring to FIG. 4, it is a flowchart of another power configuration method according to an embodiment of the present disclosure. The method is applied to a base station or a network equipment, and as shown in FIG. 4, includes the following steps:

Step 401, judging whether the terminal transmits with high power, wherein the high power is higher than a maximum transmitting power of a default power class;

Step 402, if determining that the terminal transmits with high power, configuring the terminal with resources within the time in which the terminal transmits with high power, wherein the percentage of uplink resource in the resources configured to the terminal is less than the first percentage.

Optionally, the determining that the terminal transmits with high power includes:

configuring the terminal to work in a slot with a preset slot format, wherein the percentage of uplink symbols in the preset slot format is less than the first percentage.

Optionally, the calculation method of the percentage of uplink resource includes:

determining a percentage of uplink slots in a time period in which the terminal transmits with high power; or determining a percentage of uplink symbols within the time in which the terminal transmits with high power.

With the above calculation method, the resource configured to the terminal is determined.

Optionally, for a slot in which the number of flexible symbols is less than or equal to a symbol number threshold, the flexible symbols in this slot are not used as the uplink symbol;

for a slot in which the number of flexible symbols is greater than the symbol number threshold, the flexible symbols in this slot are used as the uplink symbol according to a third percentage.

Optionally, the uplink slot includes: a slot in which the percentage of uplink symbols exceeds the second percentage;

wherein, for a slot in which the number of flexible symbols is less than or equal to the symbol number threshold, the flexible symbols in this slot are not used as the uplink symbol;

for a slot in which the number of flexible symbols is greater than the symbol number threshold, the flexible symbols in this slot are used as the uplink symbol according to a third percentage.

It should be noted that, for the specific implementations of this embodiment, which is an implementation of a base station corresponding to the embodiments shown in FIGS. 2 and 3, reference may be made to the related descriptions of the embodiments shown in FIGS. 2 and 3, and the same beneficial effects are achieved. In order to avoid repetition, these will not be described again here.

Figure 5:
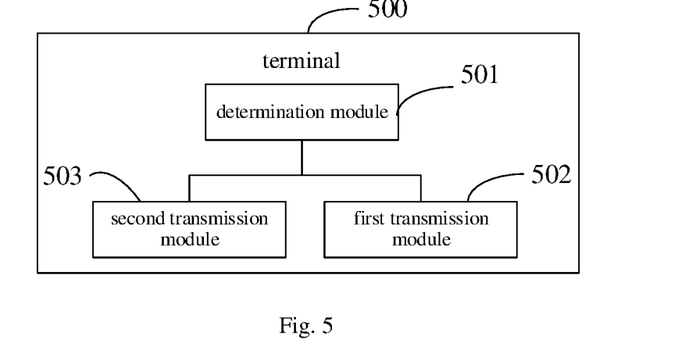
FIG. 5 is a structural diagram of a terminal according to an embodiment of the present disclosure.

Referring to FIG. 5, it is a structural diagram of a terminal according to an embodiment of the present disclosure. As shown in FIG. 5, the terminal 500 includes:

a determination module 501 configured to determine a percentage of uplink resource;

a first transmission module 502 configured to transmit with high power when the percentage of uplink resource is less than a first percentage, wherein the high power is higher than a maximum transmitting power of a default power class;

a second transmission module 503 configured to transmit with low power when the percentage of uplink resource is greater than or equal to the first percentage, wherein the low power is not higher than the maximum transmitting power of the default power class.

Optionally, the first transmission module 502 is configured to transmit with high power if the terminal works in a slot with a preset slot format, wherein a percentage of uplink symbols with the preset slot format is less than the first percentage.

Optionally, the determination module 501 is configured to determine that the percentage of uplink resource is less than the first percentage if the terminal works in a slot with the preset slot format; or the determination module 501 is configured to determine a percentage of uplink resource within a certain time period if a working slot of the terminal is not limited to the preset slot format.

Optionally, the determination module 501 is configured to determine a percentage of uplink resource within a certain time period.

Optionally, the determination module 501 is configured to determine a percentage of uplink slots within the certain time period; or Optionally, the determination module 501 is configured to determine a percentage of uplink symbols within the certain time period.

Optionally, the certain time period is a time period configured by a network, or a time period predefined by a protocol, or a time period determined by the terminal.

Optionally, for a slot in which a number of flexible symbols is less than or equal to a symbol number threshold, the flexible symbols in this slot are not used as the uplink symbol;

for a slot in which the number of flexible symbols is greater than the symbol number threshold, the flexible symbols in this slot are used as the uplink symbol according to a third percentage.

Optionally, the uplink slot includes: a slot in which the percentage of uplink symbols exceeds a second percentage;

wherein, for a slot in which a number of flexible symbols is less than or equal to a symbol number threshold, the flexible symbols in this slot are not used as the uplink symbol;

for a slot in which the number of flexible symbols is greater than the symbol number threshold, the flexible symbols in this slot are used as the uplink symbol according to a third percentage.

Figure 6:
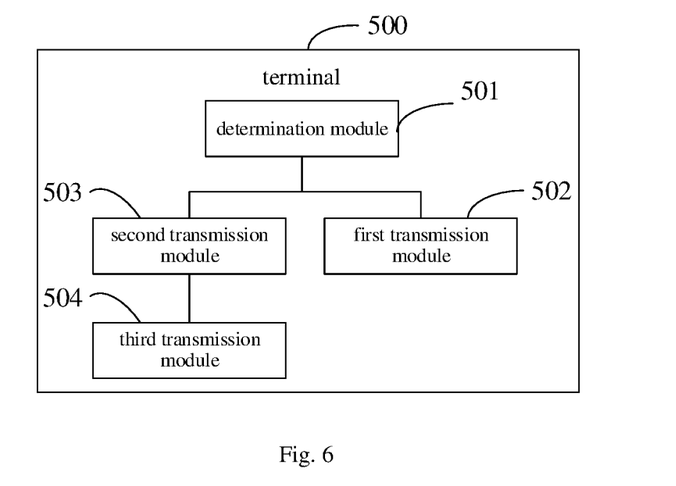
FIG. 6 is a structural diagram of another terminal according to an embodiment of the present disclosure.

Optionally, as shown in FIG. 6, the terminal 500 further includes:

a third transmission module 504 configured to transmit with the high power if a resource in which the percentage of uplink resource is less than the first percentage is detected.

The terminal provided by the embodiment of the present disclosure can implement the processes implemented by the terminal in the method embodiments of FIGS. 2 to 3, and to avoid repetition, details are not described herein again. The terminal can prevent the radiation SAR from being out of limit.

Figure 7:
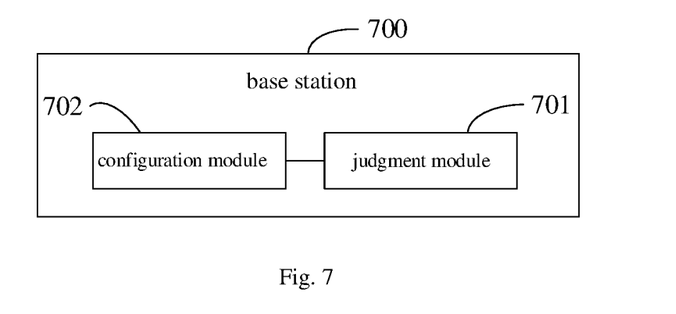
FIG. 7 is a structural diagram of a base station according to an embodiment of the present disclosure.

Referring to FIG. 7, it is a structural diagram of a base station according to an embodiment of the present disclosure. As shown in FIG. 7, the base station includes:

a judgment module 701 configured to judge whether the terminal transmits with high power, wherein the high power is higher than a maximum transmitting power of a default power class;

a configuration module 702 configured to, if it is determined that the terminal transmits with high power, configure the terminal with resources within the time in which the terminal transmits with high power, wherein the percentage of uplink resource in the resources configured to the terminal is less than the first percentage.

Optionally, the determining that the terminal transmits with high power includes:

configuring the terminal to work in a slot with a preset slot format, wherein the percentage of uplink symbols in the preset slot format is less than the first percentage.

Optionally, the calculation method of the percentage of uplink resource includes:

determining a percentage of uplink slots in a time period in which the terminal transmits with high power; or determining a percentage of uplink symbols within the time in which the terminal transmits with high power.

Optionally, for a slot in which the number of flexible symbols is less than or equal to a symbol number threshold, the flexible symbols in this slot are not used as the uplink symbol;

for a slot in which the number of flexible symbols is greater than the symbol number threshold, the flexible symbols in this slot are used as the uplink symbol according to a third percentage.

Optionally, the uplink slot includes: a slot in which the percentage of uplink symbols exceeds the second percentage;

wherein, for a slot in which the number of flexible symbols is less than or equal to the symbol number threshold, the flexible symbols in this slot are not used as the uplink symbol;

for a slot in which the number of flexible symbols is greater than the symbol number threshold, the flexible symbols in this slot are used as the uplink symbol according to a third percentage.

The base station provided by the embodiment of the present disclosure can implement the processes implemented by the base station in the method embodiment of FIG. 4, and to avoid repetition, details are not described herein again. The base station can prevent the radiation SAR from being out of limit.

Figure 8:
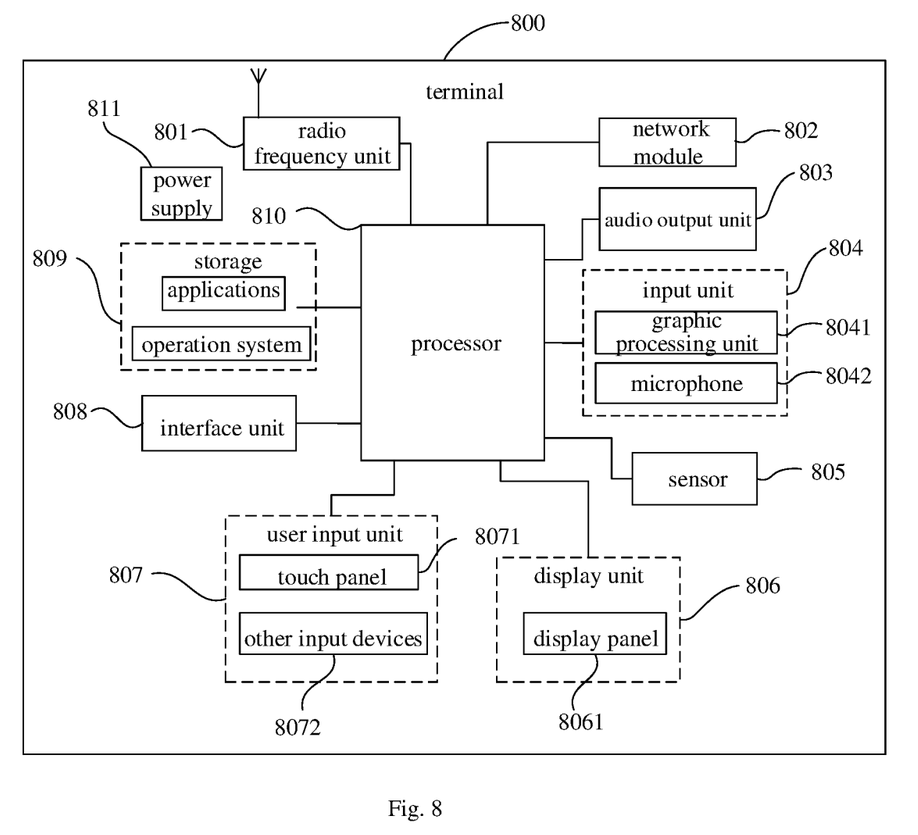
FIG. 8 is a structural diagram of another terminal according to an embodiment of the present disclosure.

FIG. 8 is a schematic diagram of hardware structure of an terminal according to embodiments of the present disclosure.

The terminal 800 includes but is not limited to: a radio frequency unit 801, a network module 802, an audio output unit 803, an input unit 804, a sensor 805, a display unit 806, a user input unit 807, an interface unit 808, a storage 809, a processor 810, and a power supply 811 and other components. Those skilled in the art can understand that the terminal structure shown in FIG. 8 does not constitute a limitation on the terminal, and the terminal may include more or less components than those shown in the figure, or combine certain components, or have different component arrangement. In the embodiments of the present disclosure, the terminal include, but is not limited to, a mobile phone, a tablet, a notebook computer, a palmtop computer, an on-vehicle terminal, a wearable device, and a pedometer, etc.

Wherein the processor 810 is configured to determine the percentage of uplink resource;

the radio frequency unit 801 is configured to transmit with high power when the percentage of uplink resource is less than a first percentage, wherein the high power is higher than a maximum transmitting power of a default power class;

the radio frequency unit 801 is also configured to transmit with low power when the percentage of uplink resource is greater than or equal to the first percentage, wherein the low power is not higher than the maximum transmitting power of the default power class.

Optionally, the transmission, that is performed by the processor 810, with the high power when the percentage of uplink resource is less than the first percentage includes:

transmitting with the high power if the terminal works in a slot with a preset slot format, wherein a percentage of uplink symbols with the preset slot format is less than the first percentage.

Optionally, the determination, that is performed by the processor 810, the percentage of uplink resource includes:

determining that the percentage of uplink resource is less than the first percentage if the terminal works in a slot with the preset slot format; or determining a percentage of uplink resource within a certain time period if a working slot of the terminal is not limited to the preset slot format.

Optionally, the determination, that is performed by the processor 810, the percentage of uplink resource includes:

determining a percentage of uplink resource within a certain time period.

Optionally, the determination, that is performed by the processor 810, the percentage of uplink resource within the certain time period includes:

determining a percentage of uplink slots within the certain time period; or determining a percentage of uplink symbols within the certain time period.

Optionally, the certain time period is a time period configured by a network, or a time period predefined by a protocol, or a time period determined by the terminal.

Optionally, for a slot in which a number of flexible symbols is less than or equal to a symbol number threshold, the flexible symbols in this slot are not used as the uplink symbol;

for a slot in which the number of flexible symbols is greater than the symbol number threshold, the flexible symbols in this slot are used as the uplink symbol according to a third percentage.

Optionally, the uplink slot includes: a slot in which the percentage of uplink symbols exceeds a second percentage;

wherein, for a slot in which a number of flexible symbols is less than or equal to a symbol number threshold, the flexible symbols in this slot are not used as the uplink symbol;

for a slot in which the number of flexible symbols is greater than the symbol number threshold, the flexible symbols in this slot are used as the uplink symbol according to a third percentage.

Optionally, after the transmission with the low power when the percentage of uplink resource is greater than or equal to the first percentage, the radio frequency unit 801 is further configured to: transmit with the high power if a resource in which the percentage of uplink resource is less than the first percentage is detected.

The terminal can prevent the radio SAR from being out of limit.

It should be understood that, in the embodiment of the present disclosure, the radio frequency unit 801 may be used for receiving and sending signals during the information reception and transmission or a call. Specifically, the downlink data from the base station is received and given to the processor 810 for processing; further, the uplink data is sent to the base station. Generally, the radio frequency unit 801 includes, but is not limited to, an antenna, at least one amplifier, a transceiver, a coupler, a low noise amplifier, a duplexer, and the like. In addition, the radio frequency unit 801 can also communicate with the network and other devices through a wireless communication system.

The terminal provides users with wireless broadband Internet access through the network module 802, such as helping users to send and receive emails, browse web pages, and access streaming media, etc.

The audio output unit 803 can convert the audio data received by the radio frequency unit 801 or the network module 802 or stored in the storage 809 into audio signals and output them as sounds. Moreover, the audio output unit 803 may also provide audio output related to a specific function performed by the terminal 800 (for example, call signal reception sound, message reception sound, etc.). The audio output unit 803 includes a speaker, a buzzer, a receiver, and the like.

The input unit 804 is used to receive audio or video signals. The input unit 804 may include a graphics processing unit (GPU) 8041 and a microphone 8042. The GPU 8041 processes the still pictures or image data obtained by an image capture device (such as a camera) in a video capture mode or an image capture mode. The processed image frames may be displayed on the display unit 806. The image frames processed by the GPU 8041 may be stored in the storage 809 (or other storage medium) or sent via the radio frequency unit 801 or the network module 802. The microphone 8042 can receive sound and can process such sound into audio data. The processed audio data can be converted in the telephone call mode into a format that can be sent by the radio frequency unit 801 to a mobile communication base station for output.

The terminal 800 further includes at least one sensor 805, such as a light sensor, a motion sensor, and other sensors. Specifically, the light sensor includes an ambient light sensor and a proximity sensor. The ambient light sensor can adjust the brightness of the display panel 8061 according to the brightness of the ambient light. The proximity sensor can close the display panel 8061 and/or the backlight when the terminal 800 is moved to the ear. As a kind of motion sensor, the accelerometer sensor can detect the magnitudes of accelerations in various directions (usually, three axes), can detect the magnitude and direction of gravity when stationary, and can be used to identify terminal posture (such as horizontal and vertical screen switching, related games, magnetometer posture calibration), vibration recognition related functions (such as pedometer, percussion), etc.; the sensor 805 can also include a fingerprint sensor, a pressure sensor, an iris sensor, a molecular sensor, a gyroscope, a barometer, a hygrometer, a thermometer, an infrared sensor, etc., which will not be repeated here.

The display unit 806 is used to display information input by the user or information provided to the user. The display unit 806 may include a display panel 8061, and the display panel 8061 may be configured in the form of a Liquid Crystal Display (LCD), an Organic Light-Emitting Diode (OLED), etc.

The user input unit 807 may be used to receive input numeric or character information, and generate key signal input related to user settings and function control of the terminal. Specifically, the user input unit 807 includes a touch panel 8071 and other input devices 8072. The touch panel 8071, also known as a touch screen, can collect user's touch operation on or near it (for example, the user's operation on or near the touch panel 8071 using any suitable object or accessory, such as a finger or a stylus). The touch panel 8071 may include two components: a touch detection device and a touch controller. Among them, the touch detection device detects the user's touch orientation, and detects the signal generated by the touch operation, and transmits the signal to the touch controller; the touch controller receives touch information from the touch detection device and converts it into contact coordinates, then sends the same to the processor 810, and receives and executes the command sent by the processor 810. In addition, the touch panel 8071 can be implemented in various types such as resistive, capacitive, infrared, and surface acoustic wave types. In addition to the touch panel 8071, the user input unit 807 may also include other input devices 8072. Specifically, other input devices 8072 may include, but are not limited to, a physical keyboard, function keys (such as volume control buttons, switch buttons, etc.), a trackball, a mouse, and a joystick, which will not be repeated here.

Further, the touch panel 8071 may be overlaid on the display panel 8061. When the touch panel 8071 detects a touch operation on or near it, it transmits the touch operation to the processor 8010 to determine the type of touch event, and then the processor 810 provides a corresponding visual output on the display panel 8061 according to the type of touch event. Although in FIG. 8, the touch panel 8071 and the display panel 8061 are implemented as two independent components to realize the input and output functions of the terminal, in some embodiments, the touch panel 8071 and the display panel 8061 may be integrated to implement the input and output functions of the terminal, which is not limited here.

The interface unit 808 is an interface for connecting an external device to the terminal 800. For example, the external device may include a wired or wireless headset port, an external power (or battery charger) port, a wired or wireless data port, a memory card port, a port for connecting a device having an identification module, an audio input/output (I/O) port, a video I/O port, a headphone port, etc. The interface unit 808 may be used to receive input from external devices (e.g., data information, power, etc.) and transmit the received input to one or more elements within the terminal 800 or may be used to transfer data between the terminal 800 and the external devices.

The storage 809 may be used to store software programs and various data. The storage 809 may mainly include a program storage area and a data storage area, wherein the program storage area may store an operating system, applications required by at least one function (such as a sound playback function, an image playback function, etc.); the data storage area may store data created according to the use of a mobile phone (such as audio data, phone books, etc.), etc. In addition, the storage 809 may include a high-speed random access memory, and may also include a non-volatile storage, such as at least one magnetic disk storage device, a flash memory device, or other volatile solid-state storage devices.

The processor 810 is the control center of the terminal, connects various parts of the entire terminal by using various interfaces and lines, performs various functions and processing data of the terminal by running or executing software programs and/or modules stored in the storage 809 and calling data stored in the storage 809, so as to monitor the terminal as a whole. The processor 810 may include one or more processing units; optionally, the processor 810 may integrate an application processor and a modem processor, where the application processor mainly processes an operating system, a user interface, and applications, etc. The modem processor mainly processes wireless communication. It can be understood that the foregoing modem processor may not be integrated into the processor 810.

The terminal 800 may further include a power supply 811 (such as a battery) that supplies power to various components. optionally, the power supply 811 may be logically connected to the processor 810 through a power management system, so as to implement charging, discharging, and power consumption management through the power management system.

In addition, the terminal 800 includes some unillustrated functional modules, which will not be repeated here.

Optionally, an embodiment of the present disclosure further provides a terminal including a processor 810, a storage 809, and a computer program stored on the storage 809 and capable of running on the processor 810, the computer program implementing, when executed by the processor 810, the processes of the power configuration method embodiments as mentioned above, and achieving the same technical effects. To avoid repetition, it will not be described here again.

Figure 9:
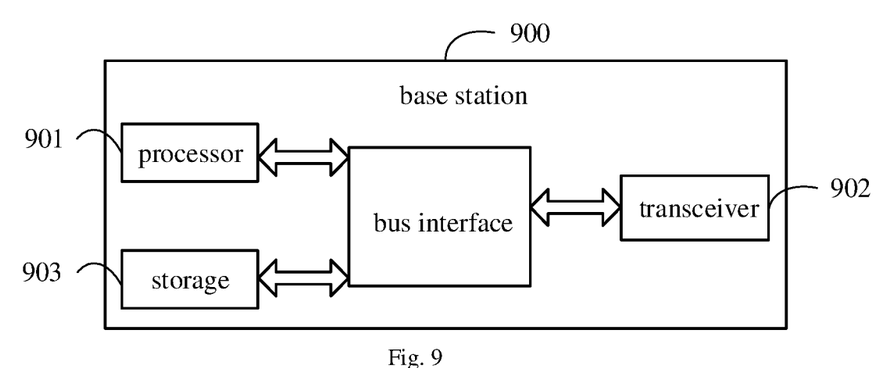
FIG. 9 is a structural diagram of another base station according to an embodiment of the present disclosure.

Referring to FIG. 9, it is a structural diagram of another base station according to an embodiment of the present disclosure. as shown in FIG. 9, the base station 900 includes: a processor 901, a transceiver 902, a storage 903 and a bus interface, wherein:

the processor 901 is configured to judge whether the terminal transmits with high power, wherein the high power is higher than a maximum transmitting power of a default power class;

the transceiver 902 is configured to, if it is determined that the terminal transmits with high power, configure the terminal with resources within the time in which the terminal transmits with high power, wherein the percentage of uplink resource in the resources configured to the terminal is less than the first percentage.

Optionally, the determining that the terminal transmits with high power includes:

configuring the terminal to work in a slot with a preset slot format, wherein the percentage of uplink symbols in the preset slot format is less than the first percentage.

Optionally, the calculation method of the percentage of uplink resource includes:

determining a percentage of uplink slots in a time period in which the terminal transmits with high power; or determining a percentage of uplink symbols within the time in which the terminal transmits with high power.

Optionally, for a slot in which the number of flexible symbols is less than or equal to a symbol number threshold, the flexible symbols in this slot are not used as the uplink symbol;

for a slot in which the number of flexible symbols is greater than the symbol number threshold, the flexible symbols in this slot are used as the uplink symbol according to a third percentage.

Optionally, the uplink slot includes: a slot in which the percentage of uplink symbols exceeds the second percentage;

wherein, for a slot in which the number of flexible symbols is less than or equal to the symbol number threshold, the flexible symbols in this slot are not used as the uplink symbol;

for a slot in which the number of flexible symbols is greater than the symbol number threshold, the flexible symbols in this slot are used as the uplink symbol according to a third percentage.

The base station can prevent the radio SAR from being out of limit.

Wherein, the transceiver 902 is configured to receive and send data under the control of the processor 901, and includes at least two antenna ports.

In FIG. 9, the bus architecture may include any number of interconnected buses and bridges, which are linked together specifically by various circuits such as one or more processors represented by the processor 901 and the storage represented by the storage 903. The bus architecture can also link various other circuits such as peripheral devices, voltage regulators, and power management circuits, etc., which are well known in the art, and therefore, they will not be further described herein. The bus interface provides interfaces. The transceiver 902 may be a plurality of elements, including a transmitter and a receiver, and provides units for communicating with various other devices on a transmission medium. For different user equipments, the user interface may also be an interface that can externally and internally connect the required devices. The connected devices include but are not limited to a keypad, a display, a speaker, a microphone, a joystick, etc.

The processor 901 is responsible for managing the bus architecture and general processing, and the storage 903 may store data used by the processor 901 when performing operations.

Optionally, an embodiment of the present disclosure further provides a base station including a processor 901, a storage 903, and a computer program stored on the storage 901 and capable of running on the processor 901, the computer program implementing, when executed by the processor 901, the processes of the power configuration method embodiments as mentioned above, and achieving the same technical effects. To avoid repetition, it will not be described here again.

An embodiment of the present disclosure further provides a computer readable storage medium having a computer program stored thereon, the computer program implementing, when executed by a processor, the processes of the power configuration method embodiments of the above terminal side or base station side, and achieving the same technical effects. To avoid repetition, it will not be described here again. Wherein, the computer readable storage medium may be, for example, a read-only memory (ROM), a random access memory (RAM), a magnetic disk, or an optical disk, etc.

It should be noted that, herein the terms "comprising", "including" or any other variant thereof are intended to cover non-exclusive inclusion, so that a process, method, article, or device that includes a series of elements includes not only those elements, but also those that are not explicitly listed, or further includes elements inherent to such process, method, article or device. Without more restrictions, the element defined by the sentence "comprising a . . . " does not exclude that there are other identical elements in the process, method, article, or device that includes the element.

With the description of the above embodiments, those skilled in the art can clearly understand that the methods in the above embodiments can be implemented by means of software plus a necessary general hardware platform, and of course, can also be implemented by hardware, but in many cases the former is a preferred implementation. Based on such an understanding, the essential technical solutions of the present disclosure, or part of the technical solutions that contributes to the related art, can be embodied in the form of a software product; the computer software product is stored in a storage medium (such as a ROM/RAM, a magnetic disk, or an optical disk), including several instructions used to cause a terminal (which may be a mobile phone, a computer, a server, an air conditioner, or a network device, etc.) to perform the methods described in various embodiments of the present disclosure.

The embodiments of the present disclosure have been described above with reference to the drawings, but the present disclosure is not limited to the above specific embodiments. The above specific embodiments are merely schematic, not restrictive. Under the inspiration of the present disclosure, many forms can be made by those skilled in the art without departing from the purpose of the present disclosure and the scope protected by the claims, all of which fall within the protective scope of the present disclosure.

What is claimed is:

1. A power configuration method applied to a terminal, comprising:
   determining a percentage of uplink resource;
   transmitting with high power when the percentage of uplink resource is less than a first percentage, wherein the high power is higher than a maximum transmitting power of a default power class;
   transmitting with low power when the percentage of uplink resource is greater than or equal to the first percentage, wherein the low power is not higher than the maximum transmitting power of the default power class.

2. The method according to claim 1, wherein transmitting with the high power when the percentage of uplink resource is less than the first percentage comprises:
   transmitting with high power when the percentage of uplink symbols transmitted or uplink slots transmitted is lower than the first percentage in a certain time period; or,
   transmitting with low power when the percentage of uplink resource is greater than or equal to the first percentage, comprises:
   transmitting with low power when the percentage of uplink symbols transmitted or uplink slots transmitted is higher than or equal to the first percentage in a certain time period.

3. The method according to claim 2, wherein the first percentage is 50%.

4. The method according to claim 1, wherein the determining the percentage of uplink resource comprises:
   determining a percentage of uplink resource within a certain time period, wherein the determining the percentage of uplink resource within the certain time period comprises:
   determining a percentage of uplink slots within the certain time period; or
   determining a percentage of uplink symbols within the certain time period.

5. The method according to claim 4, wherein the certain time period is a time period configured by a network, or a time period predefined by a protocol, or a time period determined by the terminal.

6. The method according to claim 4, wherein, for a slot in which a number of flexible symbols is less than or equal to a symbol number threshold, the flexible symbols in this slot are not used as the uplink symbol;
   for a slot in which the number of flexible symbols is greater than the symbol number threshold, the flexible symbols in this slot are used as the uplink symbol according to a third percentage.

7. The method according to claim 4, wherein the uplink slot comprises: a slot in which the percentage of uplink symbols exceeds a second percentage;
   wherein, for a slot in which a number of flexible symbols is less than or equal to a symbol number threshold, the flexible symbols in this slot are not used as the uplink symbol;
   for a slot in which the number of flexible symbols is greater than the symbol number threshold, the flexible symbols in this slot are used as the uplink symbol according to a third percentage.

8. The method according to claim 1, wherein, after the transmitting with the low power when the percentage of uplink resource is greater than or equal to the first percentage, the method further comprises:

transmitting with the high power if a resource in which the percentage of uplink resource is less than the first percentage is detected.

9. The method according to claim 1, wherein the determining the percentage of uplink resource comprises:
determining a percentage of uplink symbols in a time period in which the terminal transmits with the high power as the percentage of uplink resource.

10. A non-transitory computer readable storage medium having a computer program stored thereon, the computer program implementing, when executed by a processor, the steps of the power configuration method according to claim 1.

11. A terminal comprising: a storage, a processor, and a computer program stored on the storage and capable of running on the processor, the computer program implementing a power configuration method when executed by the processor, the power configuration method comprises:
determining a percentage of uplink resource;
transmitting with high power when the percentage of uplink resource is less than a first percentage, wherein the high power is higher than a maximum transmitting power of a default power class;
transmitting with low power when the percentage of uplink resource is greater than or equal to the first percentage, wherein the low power is not higher than the maximum transmitting power of the default power class.

12. The terminal according to claim 11, wherein in the power configuration method implemented by the computer program when executed by the processor, the transmitting with high power when the percentage of uplink resource is less than a first percentage, comprises:
transmitting with high power when the percentage of uplink symbols transmitted or uplink slots transmitted is lower than the first percentage in a certain time period; or,
the transmitting with low power when the percentage of uplink resource is greater than or equal to the first percentage, comprises:
transmitting with low power when the percentage of uplink symbols transmitted or uplink slots transmitted is higher than or equal to the first percentage in a certain time period.

13. The terminal according to claim 12, wherein in the power configuration method implemented by the computer program when executed by the processor, the first percentage is 50%.

14. The terminal according to claim 12, wherein in the power configuration method implemented by the computer program when executed by the processor, for a slot in which a number of flexible symbols is less than or equal to a symbol number threshold, the flexible symbols in this slot are not used as the uplink symbol;
for a slot in which the number of flexible symbols is greater than the symbol number threshold, the flexible symbols in this slot are used as the uplink symbol according to a third percentage.

15. The terminal according to claim 11, wherein in the power configuration method implemented by the computer program when executed by the processor, the determining the percentage of uplink resource comprises:
determining a percentage of uplink resource within a certain time period.

16. The terminal according to claim 15, wherein in the power configuration method implemented by the computer program when executed by the processor, the determining the percentage of uplink resource within the certain time period comprises:
determining a percentage of uplink slots within the certain time period; or
determining a percentage of uplink symbols within the certain time period.

17. The terminal according to claim 16, wherein in the power configuration method implemented by the computer program when executed by the processor, the uplink slot comprises: a slot in which the percentage of uplink symbols exceeds a second percentage;
wherein, for a slot in which a number of flexible symbols is less than or equal to a symbol number threshold, the flexible symbols in this slot are not used as the uplink symbol;
for a slot in which the number of flexible symbols is greater than the symbol number threshold, the flexible symbols in this slot are used as the uplink symbol according to a third percentage.

18. The terminal according to claim 15, wherein in the power configuration method implemented by the computer program when executed by the processor, the certain time period is a time period configured by a network, or a time period predefined by a protocol, or a time period determined by the terminal.

19. The terminal according to claim 11, wherein in the power configuration method implemented by the computer program when executed by the processor, after the transmitting with the low power when the percentage of uplink resource is greater than or equal to the first percentage, the method further comprises:
transmitting with the high power if a resource in which the percentage of uplink resource is less than the first percentage is detected.

20. The terminal according to claim 11, wherein in the power configuration method implemented by the computer program when executed by the processor, the determining the percentage of uplink resource comprises:
determining a percentage of uplink symbols in a time period in which the terminal transmits with the high power as the percentage of uplink resource.

* * * * *